UNITED STATES PATENT OFFICE.

ALBERT L. CLAPP, OF BRAINTREE, MASSACHUSETTS, ASSIGNOR TO HIDE-ITE LEATHER COMPANY, OF BOSTON, MASSACHUSETTS, A CORPORATION OF MAINE.

LEATHER-BOARD AND PROCESS OF PRODUCING THE SAME.

1,131,039.

Specification of Letters Patent. Patented Mar. 9, 1915.

No Drawing. Application filed January 11, 1913. Serial No. 741,478.

*To all whom it may concern:*

Be it known that I, ALBERT L. CLAPP, a citizen of the United States, residing at Braintree, in the county of Norfolk and State of Massachusetts, have invented certain new and useful Improvements in Leather-Board and Processes of Producing the Same, of which the following is a specification.

My present invention pertains to an improved leather-board, and the process of producing the same.

The invention has for its object the utilization of chrome scrap in the production of leather-board, which scrap, owing mainly to the fact that it could not be beaten out, has not, so far as I am aware, been commercially used in the production of leather-board. With the process hereinafter set forth such scrap may be employed and the benefits flowing from the presence in such scrap of certain chemicals or chemical compounds taken advantage of, or utilized in the production of the board.

The process is as follows: The chrome scrap is first passed through a rag-cutter or any other machine which will mechanically, and in the absence of moisture, cut it up or partially disintegrate the same. The chrome scrap thus treated is introduced into a beater engine along with ordinary scrap, the proportion used being from two hundred to four hundred pounds of chrome scrap to about one thousand pounds of the ordinary tanned scrap leather, the relative amounts varying according to the degree of waterproofing required. The proportions given produce a very satisfactory result. Chrome fleshings may also be added to the stock in the beater without the preliminary step of dry disintegration, as such fleshings will beat out sufficiently without previous disintegration. When the beater is thus charged, an interaction evidently takes place between the chrome salts, present in the chrome scrap, and the tannic acid present in the ordinary scrap, causing an insoluble compound to be precipitated upon the fibers of the charge. This is indicated by the change in color in the chrome scrap, passing from a greenish cast to a brown, due, no doubt, to the absorption of the tannic acid which is given off from the ordinary scrap. There is evidently produced, through this interaction, a double salt of chromium and tannin which is an insoluble compound, as the dry product formed according to the present process is rendered quite waterproof.

Ordinarily chrome leather scrap cannot be successfully beaten out, as it becomes slimy and slippery to such an extent that it will not be beaten out by the beater roll, but with the present process the scrap may be beaten out to the desired pulpy consistency. Apparently, the surface conditions of the chrome scrap are undergoing a constant change, owing to the chemical reaction, and the surface no longer presents such a slippery condition as will prevent such wet disintegration as is necessary to reduce it to a pulp of such consistency as to admit of its being formed into a board. Whatever may be the cause or action, it is found by actual use that chrome scrap, when thus manipulated in a beater will become disintegrated and form a pulp of proper consistency. By preference, alum will be added to the charge in the beater when the stock is beaten out, or nearly so, the alum precipitating more or less of the soluble materials dissolved out of the stock during the beating operation. Such matter as is thus thrown down will be distributed throughout the mass and aids or assists in making the stock waterproof. The amount of alum used is from fifteen to twenty-five pounds to the ordinary beater-load, which averages from 1300 to 1400 pounds. It will, of course, be understood that the compounds formed by the interaction of the chrome salts and the tannic acid are also insoluble and render the mass waterproof to a greater or less extent. It will likewise be understood that the process, in so far as the waterproofing effect is concerned, is not entirely dependent upon the interaction of the chrome salts present in the chrome scrap and the tannic acid, since such chrome salts as may remain in the scrap unaffected by the action of the tannic acid are in and of themselves water-repellant. This assumes, of course, that the tannic acid is not present in a quantity sufficient to interact with or convert all of the chrome salts present.

The process lends itself to the reuse of waste water, as set forth in Letters Patent of the United States No. 1,046,555, granted to me under date of December 10, 1912, for where the surcharged waste water is reused there will be present in the beater engine a relatively large amount of free tannic acid.

In fact, where the tannic acid is present in a considerable quantity it is not necessary to grind the chrome scrap to the same extent as where the tannic acid is merely derived from the ordinary tanned scrap.

Having thus described my invention, what I claim is:

1. The process of producing leather-board stock from chrome leather, which consists in beating out said leather in the presence of tannic acid.

2. The process of producing leather-board stock from chrome leather, which consists in comminuting said stock while dry, and subsequently beating out said stock in the presence of tannic acid.

3. The process of producing leather-board stock from chrome leather, which consists in comminuting said stock while dry, and subsequently beating out the same in the presence of ordinary tanned leather, whereby the chrome salts will be converted by the action of the tannic acid derived from the ordinary tanned leather and the whole charge rendered waterproof.

4. The process of producing leather-board stock from chrome tanned leather, which consists in comminuting such scrap while dry; beating out said comminuted scrap along with a charge of ordinary tanned leather scrap, and finally adding alum to precipitate the soluble matters present in the charge.

5. The process of producing leather-board stock from chrome scrap, which consists in beating up said scrap in the presence of a reagent capable of converting the chrome salts present in the chrome scrap.

6. The process of beating out chrome leather stock, which consists in comminuting the leather; placing the comminuted stock in a beater; and subjecting the same to the action of a reagent which tends to destroy the slick or slimy surface of the stock, whereby the stock may be beaten out by the beater roll.

In testimony whereof I have signed my name to this specification in the presence of two subscribing witnesses.

ALBERT L. CLAPP.

Witnesses:
HORACE A. DODGE,
BENNETT S. JONES.